(12) United States Patent
Chen

(10) Patent No.: US 7,042,538 B2
(45) Date of Patent: May 9, 2006

(54) OVERLAPPING COLOR FILTER STRUCTURE AND METHOD OF MAKING THE SAME

(75) Inventor: Hsin-Ming Chen, Hsin-Chu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/707,258

(22) Filed: Dec. 1, 2003

(65) Prior Publication Data

US 2004/0233352 A1   Nov. 25, 2004

(30) Foreign Application Priority Data

May 23, 2003   (TW) ................ 92114013 A

(51) Int. Cl.
*G02F 1/1335* (2006.01)
*G02F 1/1333* (2006.01)
*H01L 21/00* (2006.01)

(52) U.S. Cl. .................. 349/106; 349/110; 438/70

(58) Field of Classification Search ................ 349/106, 349/110, 111; 438/70
See application file for complete search history.

(56) References Cited

U.S. PATENT DOCUMENTS

| | | | | |
|---|---|---|---|---|
| 4,601,546 | A | * 7/1986 | Ohta | 349/3 |
| 4,776,675 | A | * 10/1988 | Takaochi et al. | 349/106 |
| 6,093,934 | A | * 7/2000 | Yamazaki et al. | 257/51 |
| 6,271,902 | B1 * | 8/2001 | Ogura et al. | 349/106 |
| 6,606,137 | B1 * | 8/2003 | Lee | 349/106 |
| 6,847,421 | B1 * | 1/2005 | Cheng | 349/106 |
| 2004/0075788 | A1* | 4/2004 | Cheng | 349/106 |
| 2004/0114081 | A1* | 6/2004 | Sawasaki et al. | 349/123 |
| 2004/0252271 | A1* | 12/2004 | Song | 349/155 |
| 2005/0036221 | A1* | 2/2005 | Cheng et al. | 359/885 |

* cited by examiner

*Primary Examiner*—Tarifur R. Chowdhury
(74) *Attorney, Agent, or Firm*—Winston Hsu

(57) ABSTRACT

A color filter structure of a liquid crystal display (LCD) has a plurality of color filters coupling with each other disposed on a substrate. An overlapping region is positioned between adjacent color filters, and a surface of color filter in the overlapping region is substantially in a same level as a surface of the color filters outside the overlapping region.

21 Claims, 13 Drawing Sheets

OVERLAPPING COLOR FILTER STRUCTURE AND METHOD OF MAKING THE SAME

BACKGROUND OF INVENTION

1. Field of the Invention

The present invention relates to a color filter structure and method thereof, and more particularly, to a color filter structure and method thereof applied to a liquid crystal display (LCD).

2. Description of the Prior Art

Since liquid crystal displays (LCDs) have the advantages of portability, low power consumption, and low radiation, LCDs have been widely used in various portable information products, such as notebooks, personal digital assistants (PDA), etc.

A color filter structure and thin film transistor (TFT) elements of a prior art thin film transistor liquid crystal display (TFT LCD) are respectively formed on different substrates. The TFT elements are formed in a bottom substrate by multiple photo-etching processes (PEP), while the color filter structure is formed on a top substrate by photo processes or halftone printing technology. Moreover, the method of forming the prior art LCD includes steps of forming a black matrix between any two adjacent color filters. The purpose of the black matrixes is to improve contrast of the LCD, prevent the TFT elements from generating light leakage current, and shade the oblique leaking light during operation of the LCD.

Since the top substrate and the bottom substrate are composed of different materials with different coefficients of thermal expansion, alignment error could happen due to high temperature during the assembly process. The alignment error would cause light leakage, thus at present the color filter on array (COA) technology is broadly applied to form the color filter structure over the TFT elements for avoiding the alignment error of the black matrix layer and the data line. In addition, the alignment issue of the color filter structure becomes more and more important while the substrate size enlarges and the LCD resolution increases.

Refer to FIG. 1 to FIG. 3, which are schematic diagrams of forming a prior art color filter structure 22. As shown in FIG. 1, first a black photoresist layer (not shown in FIG. 1) is formed on a glass substrate 10, and a photo process is performed to form a black matrix layer 12. Generally speaking, the black matrix layer 12 contains materials with high shading, low reflectivity, and good adhesion ability, such as chromium or black resin. Then a red color filter layer 14 is formed on the glass substrate 10, and a photo process is performed to form a red color filter array (CFA) 16. The red color filter layer 14 is a positive type photoresist or a photosensitive resin containing 10 to 50 wt % of red dye.

In order to improve filtering effect and enhance reliability of the color filter array, the red color filter array 16 is then irradiated by ultraviolet beams, and heated with an inert gas, such as nitrogen,for avoiding oxidation. The wave-length of the ultraviolet beams is approximately 320 nm, and the energy of the ultraviolet beams is approximately 20J/cm². The initial temperature range of heating is between 60 and 140° C., and the heating temperature raises at the rate of 1.5° C./sec until the temperature reaches the range between 160 and 220° C. Afterwards, the abovementioned steps are repeated to form a green color filter array 18 and a blue color filter array 20.

However, light leakage problems could happen because the chromium collapses, chromium remains, or the black matrix layer alignment error while forming the black matrix layer. In this case, the black matrix layer is not capable of shading the TFT elements, so that the light leakage current will occur. Additionally, since high-resolution LCDs are required, the critical dimension (CD) needs reducing, such that the accuracy of alignment becomes more important. Furthermore, the method of forming the prior art color filter structure would cause a side lobe between any two adjacent color filters because of the alignment problem and existence of the black matrix layer. The side lobe would influence the alignment direction of crystal molecules, and further interfere with operation of the LCD.

SUMMARY OF INVENTION

It is therefore a primary object of the claimed invention to provide a color filter structure and method thereof for avoiding the above-mentioned problems.

It is another object of the claimed invention to provide a method of forming a color filter structure by an attenuated mask.

According to the claimed invention, a color filter structure of an LCD is disclosed. The color filter structure includes a substrate, and a plurality of color filters coupling with each other. The color filter structure further includes an overlapping region between any two neighboring color filters, wherein surfaces of the color filters in the overlapping region and the color filters outside the overlapping region are substantially coplanar.

It is an advantage of the claimed invention that an extra black matrix layer is not necessary while the light shading effect is still achieved. In addition, the color filter structure of the present invention has a smooth surface which planarizes the transparent electrode, increases the aperture ratio, and reduces the coupling effect between pixels.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
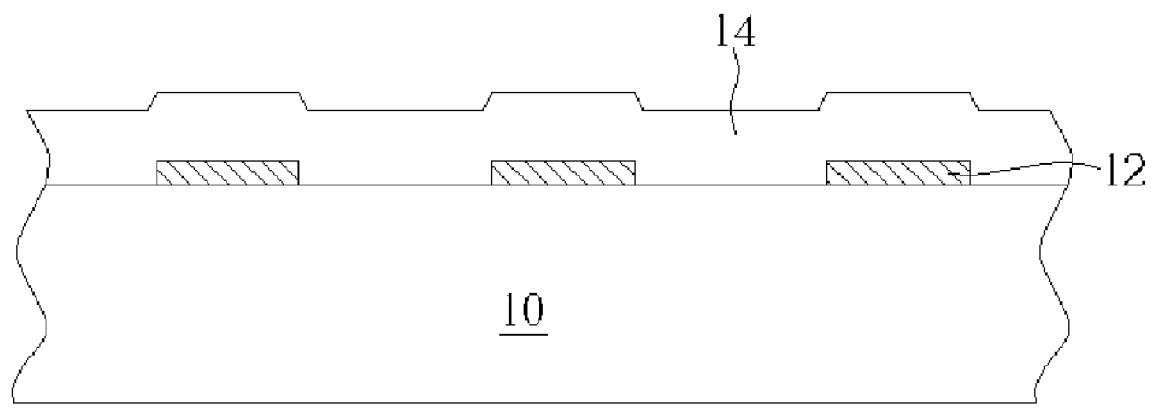
FIG. 1 to FIG. 3 are schematic diagrams illustrating a method of forming a color filter structure according to the prior art.
Figure 2:
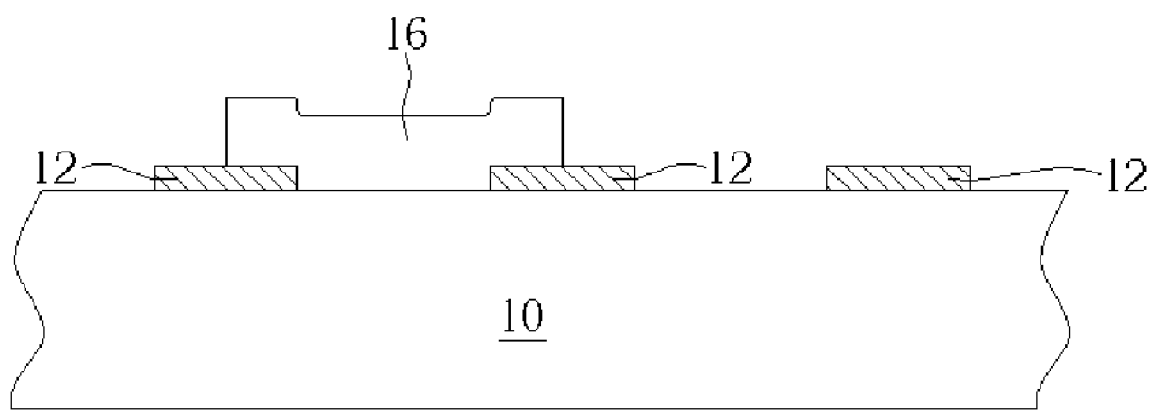
Figure 3:
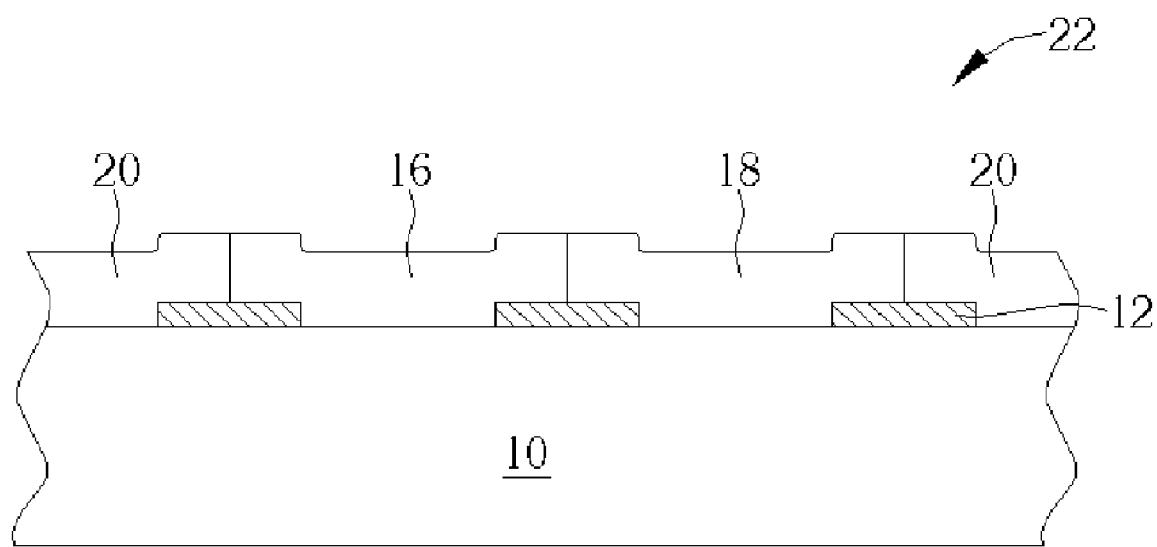
Figure 4:
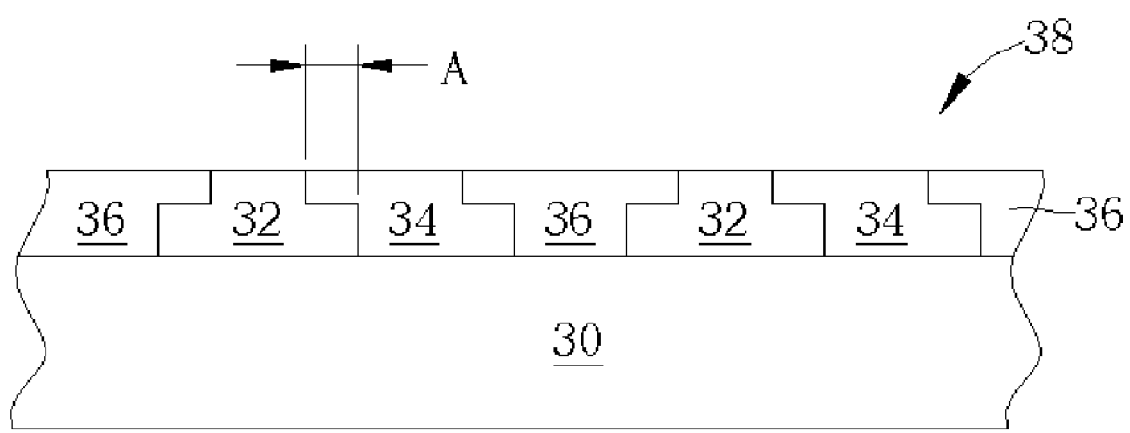
FIG. 4 is a schematic diagram of a color filter structure of the present invention.

Refer to FIG. 4, which is a schematic diagram of a color filter structure 38 of the present invention. As shown in FIG. 4, the color filter structure 38 of the present invention includes a plurality of red, green, and blue color filters 32, 34, and 36 coupling with each other on a glass substrate 30. Any two neighboring color filters, such as the red color filter 32 and the green color filter 34, have an overlapping region A between. Further, the thickness of the red color filter 32 positioned in a bottom layer of the overlapping region A is at least half the thickness of the color filters positioned outside the overlapping region A, such that the color filter structure has an substantially smooth surface.

Figure 5:
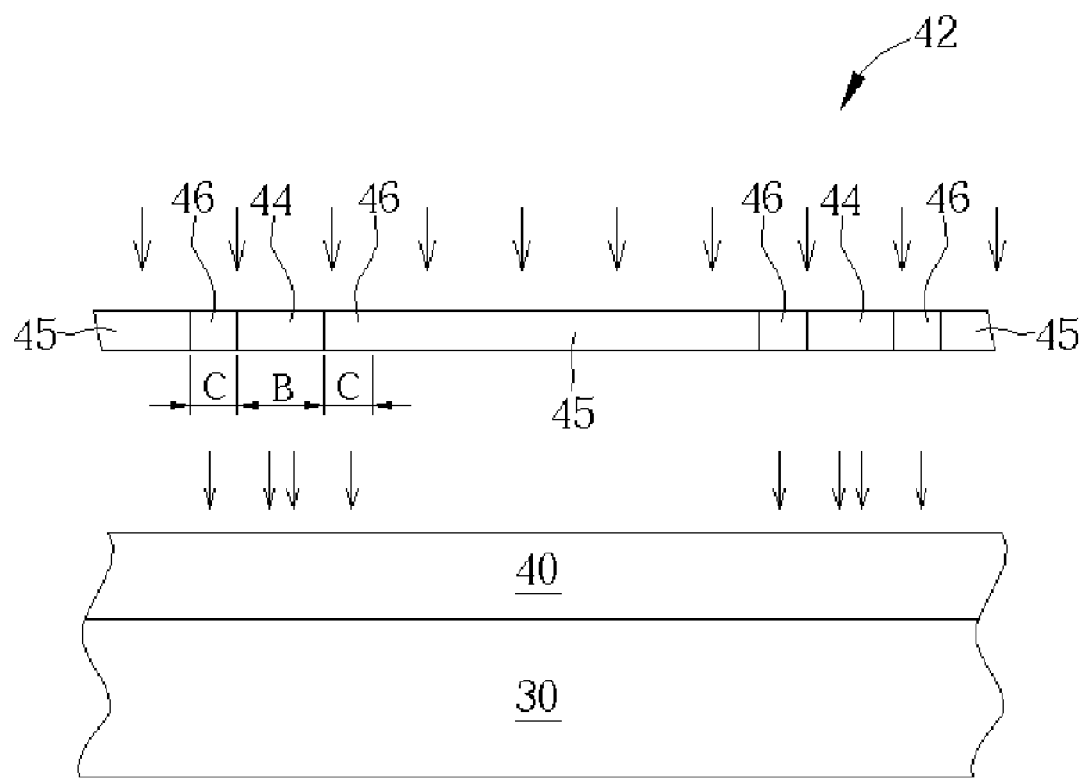
FIG. 5 and FIG. 7 to FIG. 11 are schematic diagrams illustrating a method of forming a color filter structure according to the present invention.
Figure 6A:
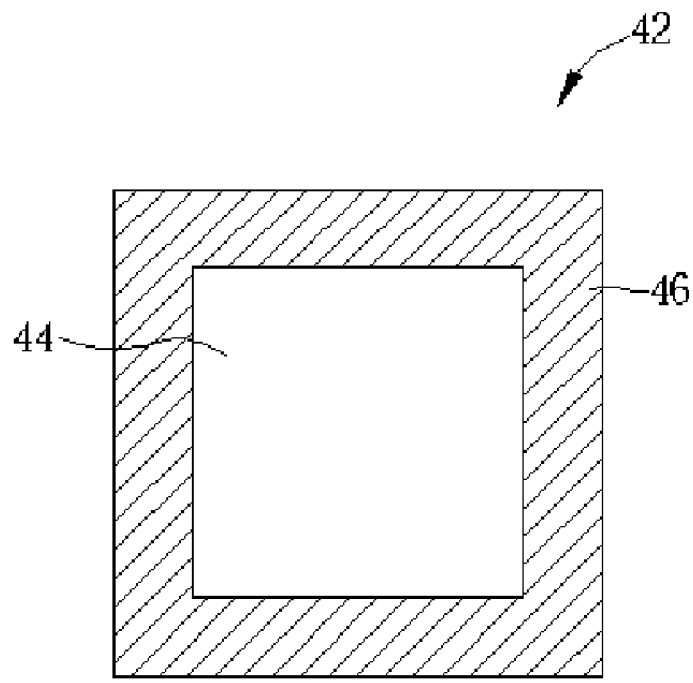
FIG. 6a and FIG. 6b are schematic diagrams of an attenuated mask of the present invention.
Figure 6B:
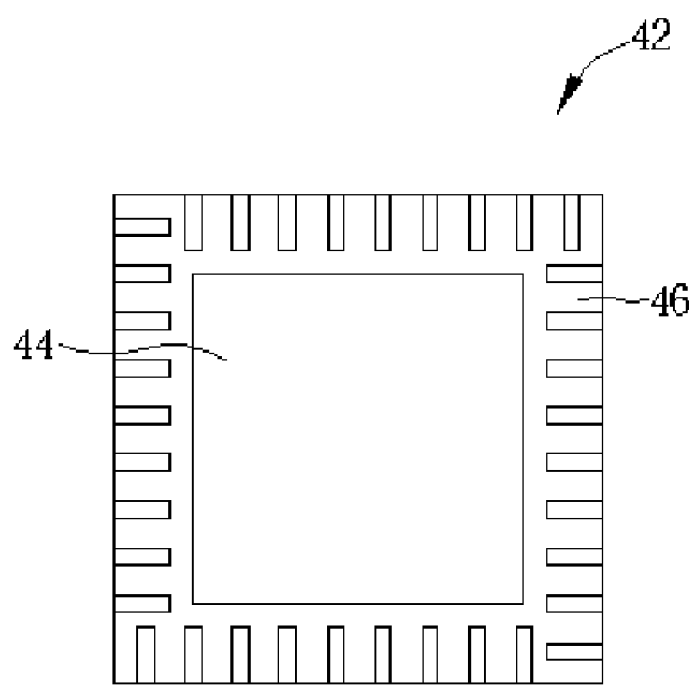
Figure 7:
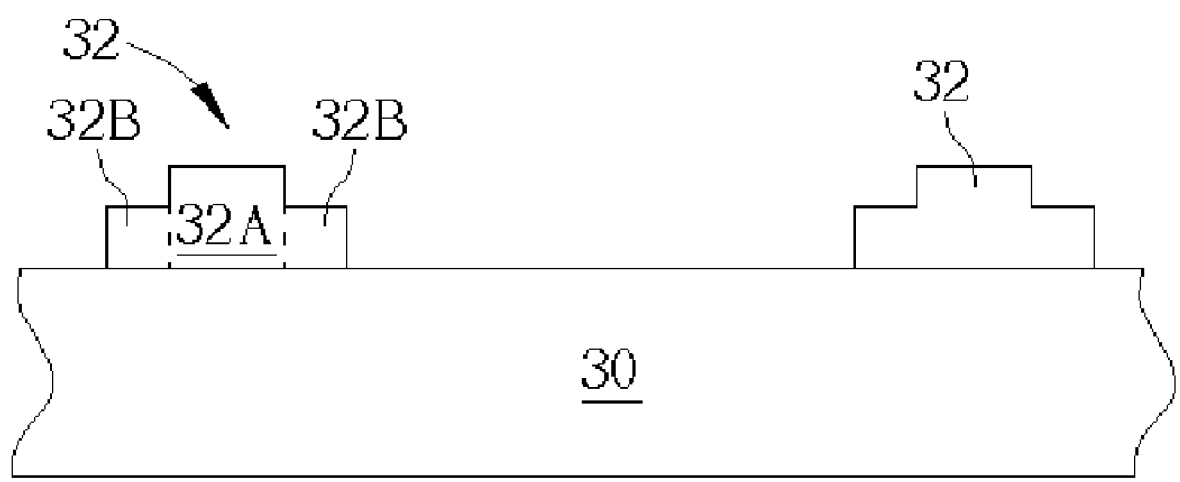

Refer to FIG. 5 to FIG. 11. FIG. 5 and FIG. 7 to FIG. 11 are schematic diagrams illustrating a method of forming the color filter structure 38 according to the present invention. FIG. 6a and FIG. 6b are schematic diagrams of an attenuated mask 42 of the present invention. As shown in FIG. 5, a red color filter layer 40 is first formed on the substrate 30, and a first photo process is performed by an attenuated mask 42 to form a plurality of red color filters 32 (not shown in FIG. 5) in the red color filter layer 40. The attenuated mask 42 includes at least a transparent region 44, at least a translucent region 46, and an opaque region 45. As shown in FIG. 6a and 6b, the translucent region 46 is either a translucent glass or a transparent glass having openings. Therefore, the color filter structure 38 can be formed by the attenuated mask 42 with different aperture ratios or by an ordinary mask based on process requirements. In a preferred embodiment of the present invention, the aperture ratio of the translucent region 46 is 6%, the transparent region 44 has a width B, and the translucent region 46 has a width C. As shown in FIG. 7, since each region of the attenuated mask has different aperture ratios, the red color filter 32 has an inverse T-shaped structure including a first part 32A corresponding to the transparent region 44 and a second part 32B corresponding to the translucent region 46.

Figure 8:
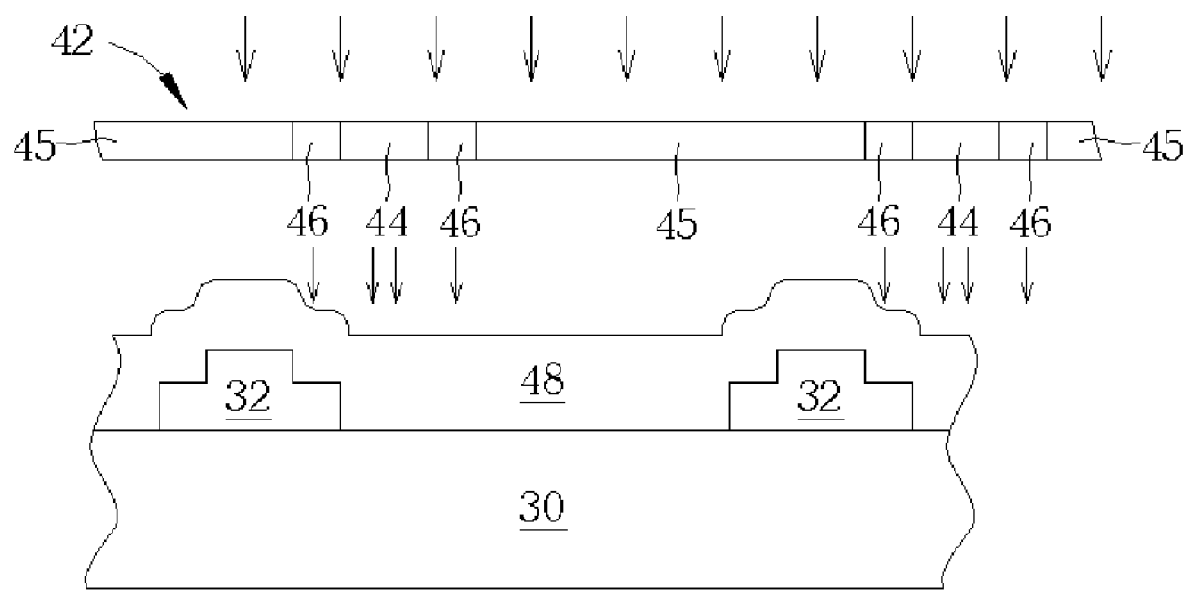
Figure 9:
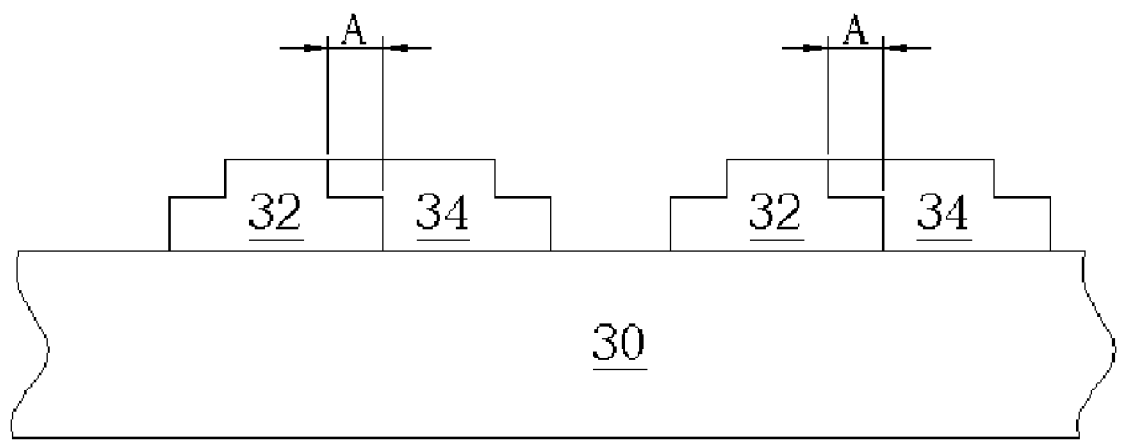

As shown in FIG. 8, a green color filter layer 48 is formed on the substrate 30. Since a plurality of red color filters 32 were already formed on the substrate 30, the surface of the green color filter layer 48 is not smooth. Then the attenuated mask 42 is shifted a certain distance "B+C" toward the right or another attenuated mask having a pattern shifted by a distance "B+C" is utilized, such that the translucent region 46 of the attenuated mask 42 is shifted over the second part 32B of the red color filter 32. Afterwards, a second photo process is performed under the same conditions as the first photo process to form a plurality of green color filters 34 in the green color filter layer 48. Each green color filter 34 is stair-shaped, and overlaps parts of the corresponding red color filter 32. The width of the overlapping region A equals the width of the translucent region C. Seeing that the surface of the red color filter 32 and the green color filter 34 is smooth, the prior art side lobe problem will not happen in the present invention. In the preferred embodiment of the present invention, the aperture ratio of the translucent region 46 is 6%, thus the thickness of the red color filter 32 positioned under the overlapping region A is at least half the thickness of the red color filters 32 or the green color filters 34 outside the overlapping region A as shown in FIG. 9.

Figure 10:
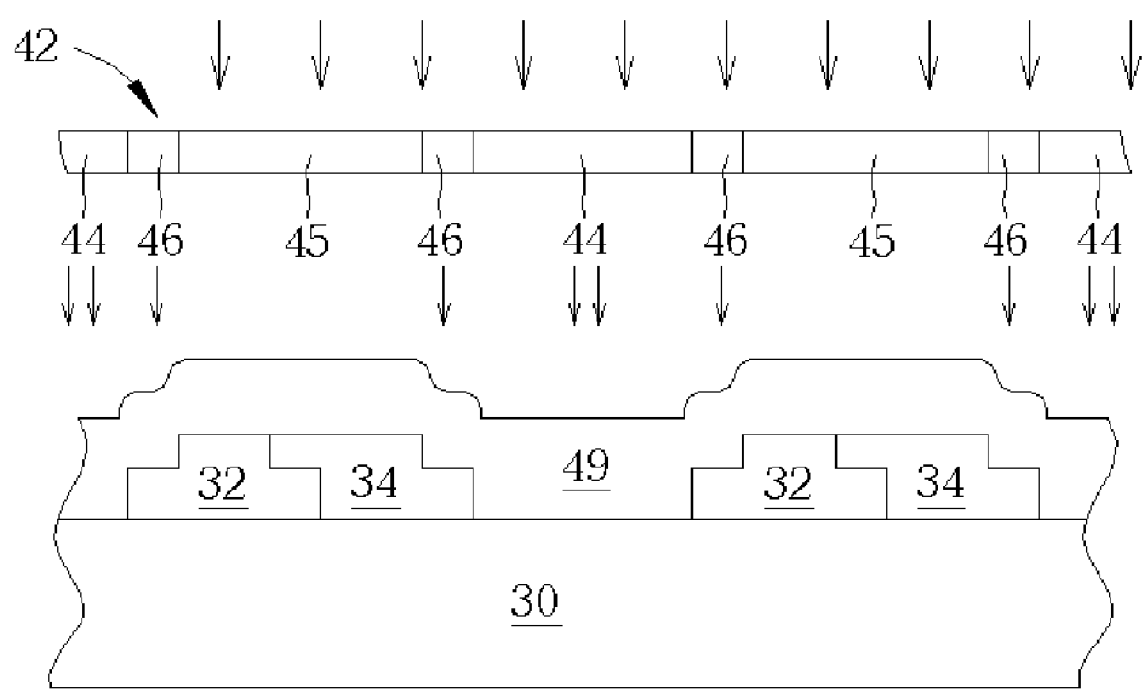
Figure 11:
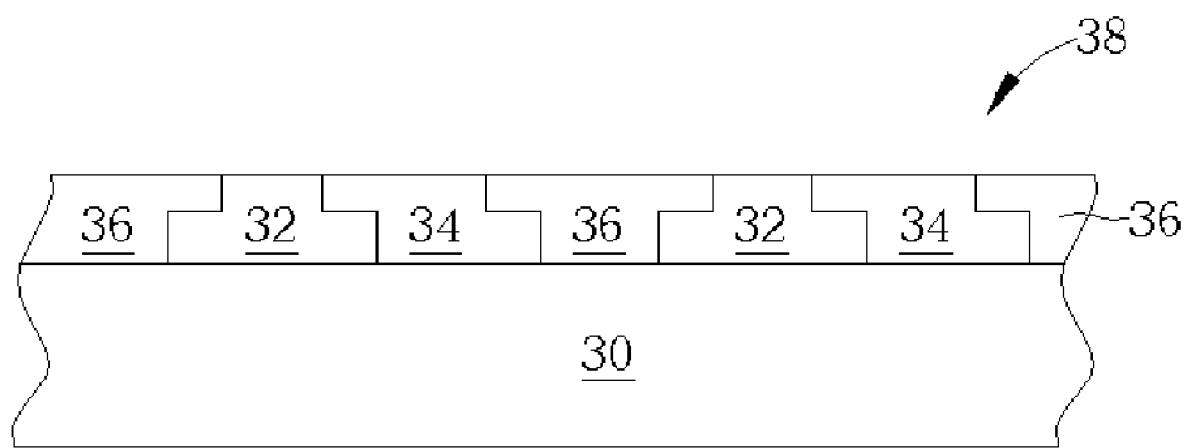

As shown in FIG. 10 and FIG. 11, a blue color filter layer 49 is formed on the substrate 30. Since a plurality of red color filters 32 and green color filters 34 were already formed on the substrate 30, the surface of the blue color filter layer 49 is not smooth. Then the attenuated mask 42 is shifted a certain distance "B+C" toward the right, and a third photo process is performed to form a plurality of blue color filters 36. The third photo process is performed under the same conditions as the second photo process. Each blue color filter 36 is T-shaped, and overlaps parts of the adjacent red color filter 32 and green color filter 34. Seeing that the surface of the red color filters 32, the green color filters 34, and the blue color filters 36 is substantially coplanar, the color filter structure 38 having a plurality of color filters coupling with each other and a smooth surface is formed.

In addition, after the red color filters 32 are formed, an ultraviolet beam treatment can be performed for improving filtering effect and enhancing reliability, and a thermal process can be then performed with an inert gas to prevent oxidation. The same treatment can also be respectively applied to the green color filters 34 and the blue color filters 36 while they are formed.

In the preferred embodiment of the present invention, the color filter structure 38 is formed on the surface of the glass substrate 30, wherein the substrate 30 is the top substrate of a TFT LCD. However, the present invention is not limited by the preferred embodiment, and the color filter structure 38 of the present invention can be applied to other type LCDs, such as a low temperature polysilicon thin film transistor liquid crystal display (LTPS TFT LCD) having a top gate structure.

Figure 12:
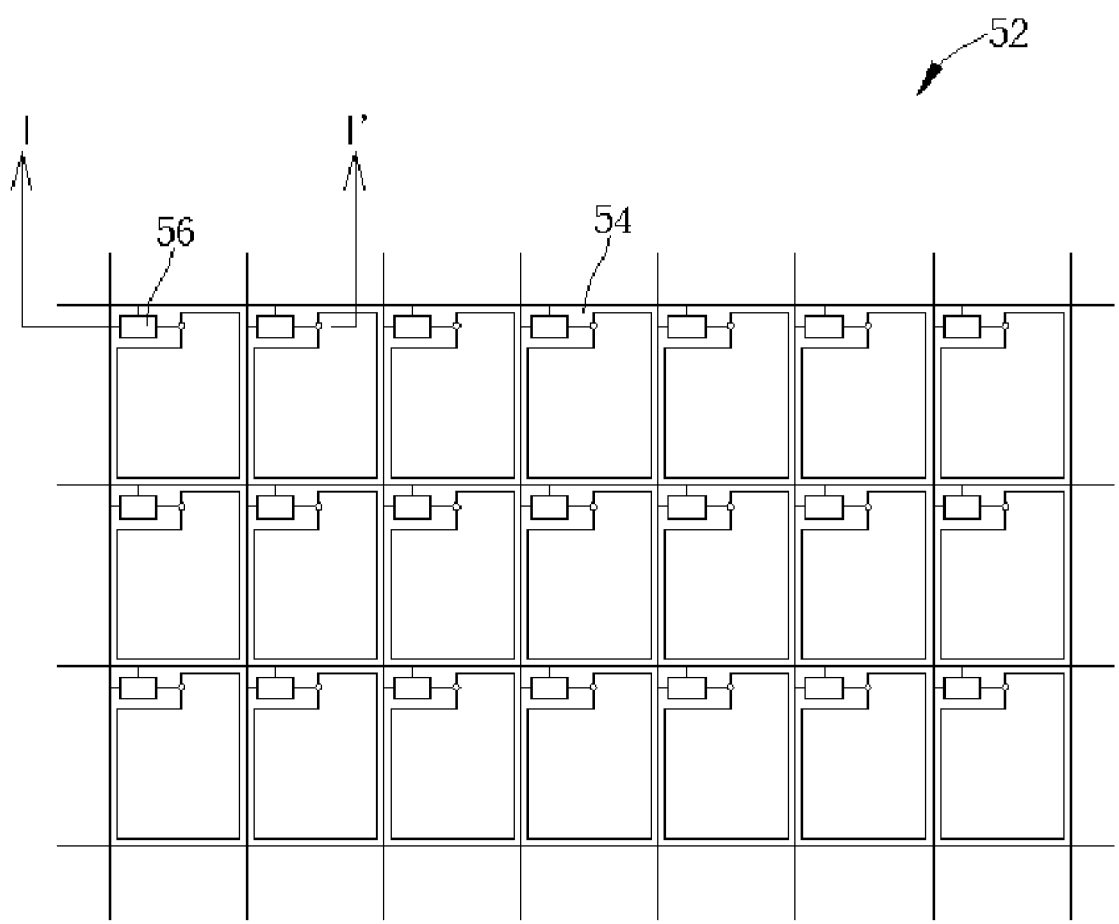
FIG. 12 is a top view of the color filter structure of the present invention applied to an LCD.
Figure 13:
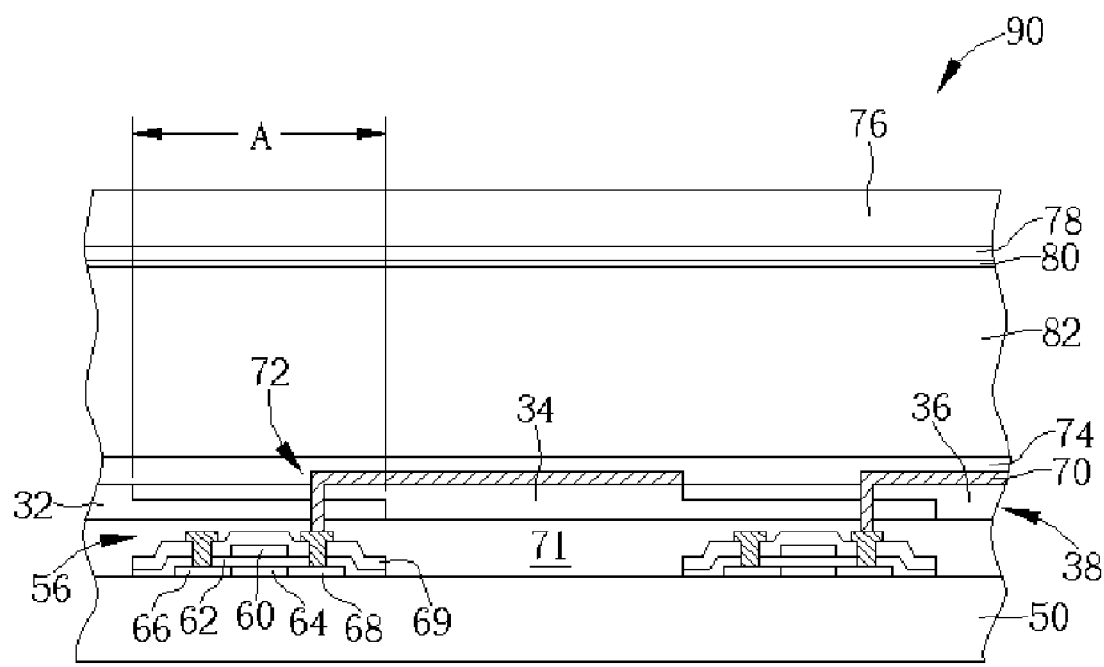
FIG. 13 is a cross-section diagram of the color filter structure shown in FIG. 12 along a tangent line I–I".

Refer to FIG. 12 and FIG. 13. FIG. 12 is a top view of the color filter structure 38 of the present invention applied to an LTPS TFT LCD. FIG. 13 is a cross-section diagram of the color filter structure 38 shown in FIG. 12 along a tangent line I–I'. As shown in FIG. 12 and FIG. 13, the color filter structure 38 is formed on a glass substrate 50 including a pixel array 52. The pixel array 52 including a plurality of pixels 54.

A top gate LTPS TFT 56 is first formed at a corner of each pixel 54, wherein each pixel 54 includes a top gate 60, a gate dielectric layer 62, a channel 64, a source 66, and a drain 68. A passivation layer 69 and a planarization layer 71 are sequentially formed on the LTPS TFT 56.

Then the color filter structure 38 of the present invention is formed on the planarization layer 71, wherein the red, green, and blue color filter 32, 34, and 36 correspond to different pixels 54, and the overlapping region A of any two neighboring color filters is over the corresponding LTPS TFT 56 and serves as a black matrix. In addition, a contact hole 72 is formed, and then a transparent conductive layer 70, such as ITO, is deposited. The transparent conductive layer 70 is connected to the drain 68 via the contact hole 72. Finally, an orientation film 74 is formed on the substrate 50.

On the other hand, a transparent electrode 78 and an orientation film 80 are sequentially formed on another substrate 76. Then the substrates 50 and 76 are assembled together and crystal molecules are implanted between the substrates 50 and 76.

In summary, the present invention performs three photo processes under like conditions to form the color filter structure which has a smooth surface and an overlapping region between any two neighboring color filters. The overlapping regions serve as black matrixes for preventing light leakage current. Besides, the present invention can be also applied to an LCD having a black matrix layer.

In contrast to the prior art, the present invention is capable of shading light without a black matrix, thus the alignment of the black matrix layer is no longer a problem. In addition, the smooth surface of the color filter structure conquers the side lobe problem, increases the aperture ratio, and reduces the coupling effect between adjacent pixels.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A color filter structure of a liquid crystal display (LCD) comprising:
   a substrate; and
   a plurality of color filters coupling with each other on a surface of the substrate;
   wherein an overlapping region exists between any two neighboring color filters, each overlapping region and the color filters outside the overlapping region are coplanar, the color filters positioned in a bottom layer of the overlapping region have a first thickness, the color filters outside the overlapping region have a second thickness, and a value of the first thickness is at least half of a value of the second thickness.

2. The color filter structure of claim 1 wherein the LCD is a low temperature polysilicon thin film transistor (LTPS TFT) LCD.

3. The color filter structure of claim 1 wherein the substrate further comprises a pixel array positioned under the color filters and a transparent conductive layer positioned over the color filters.

4. The color filter structure of claim 3 wherein the LCD is a color filter on array (COA) LCD.

5. The color filter structure of claim 3 further comprising a contact hole for connecting the pixel array and the transparent conductive layer.

6. The color filter structure of claim 1 wherein the substrate is a transparent glass substrate.

7. The color filter structure of claim 1 wherein the overlapping region serves as a black matrix.

8. The color filter structure of claim 1 wherein the substrate further comprises a black matrix layer positioned between any two neighboring color filters.

9. The color filter structure of claim 1 wherein the color filters comprising at least a first color filter, a second color filter, and a third color filter.

10. The color filter structure of claim 9 wherein the first color filter has an inverse T-shaped structure, the second color filter has a stair-shaped structure, and the third color filter structure has a T-shaped structure.

11. The color filter, structure of claim 9 wherein the color filters comprise at least a red color filter, a green color filter, and a blue color filter.

12. A method for forming a color filter structure of a liquid crystal display (LCD), the method comprising:
    providing a glass substrate;
    forming a first color filter on the glass substrate; and
        forming a second color filter which couples with the first color filter on the glass substrate;
    wherein an overlapping region exists between the first color filter and the second color filter, the overlapping region, the first color filter, and the second color filter outside the overlapping region are all approximately coplanar, the second color filter positioned in the overlapping region covers the first color filter, and a thickness of the first color filter in the overlapping region is at least half of a thickness of the first color filter outside the overlapping region.

13. The method of claim 12 wherein the LCD is a low temperature polysilicon thin film transistor (LTPS TFT) LCD.

14. The method of claim 12 wherein an attenuated mask is employed to define patterns of the first color filter and the second color filter.

15. The method of claim 14 wherein the attenuated mask comprises at least a transparent region and a translucent region.

16. The method of claim 12 wherein steps of forming the first color filter further comprises:
    forming a first color filter layer on the glass substrate;
    providing an attenuated mask comprising at least a transparent region and a translucent region; and
    performing a first photo process to form a first pattern corresponding to the transparent region and a second pattern corresponding to the translucent region in the first color filter layer, the first pattern and the second pattern having different thicknesses.

17. The method of claim 16 wherein steps of forming the second color filter comprises:
    forming a second color filter layer on the glass substrate, the second color filter layer overlapping a portion of the first color filter layer; and
    performing a second photo process by the attenuated mask to form a third pattern in the second color filter layer, the third pattern overlapping the second pattern of the first color filter layer, and to form a fourth pattern having a thickness differing from a thickness of the third pattern in the second color filter layer, the third pattern and the fourth pattern being coplanar.

18. The method of claim 17 wherein the first photo process and the second photo process are performed under like conditions.

19. The method of claim 12 wherein the overlapping region servos as a black matrix.

20. The method of claim 12 wherein the glass substrate further comprises a black matrix layer positioned between the first color filter and the second color filter adjacent to the first color filter.

21. A color filter structure of a liquid crystal display (LCD) comprising:
    a substrate; and
    a plurality of color filters coupling with each other on a surface of the substrate;
    wherein an overlapping region exists between any two neighboring color filters, each overlapping region and the color filters outside the overlapping region are coplanar,
    wherein the color filters comprising at least a first color filter, a second color filter, and a third color filter,
    wherein the first color filter has an inverse T-shaped structure, the second color filter has a stair-shaped structure, and the third color filter structure has a T-shaped structure.

* * * * *